Dec. 30, 1941. F. O. HICKLING 2,267,863
METHOD OF MAKING CAGES FOR USE IN ROLLER BEARINGS
Filed Jan. 13, 1939 4 Sheets-Sheet 1
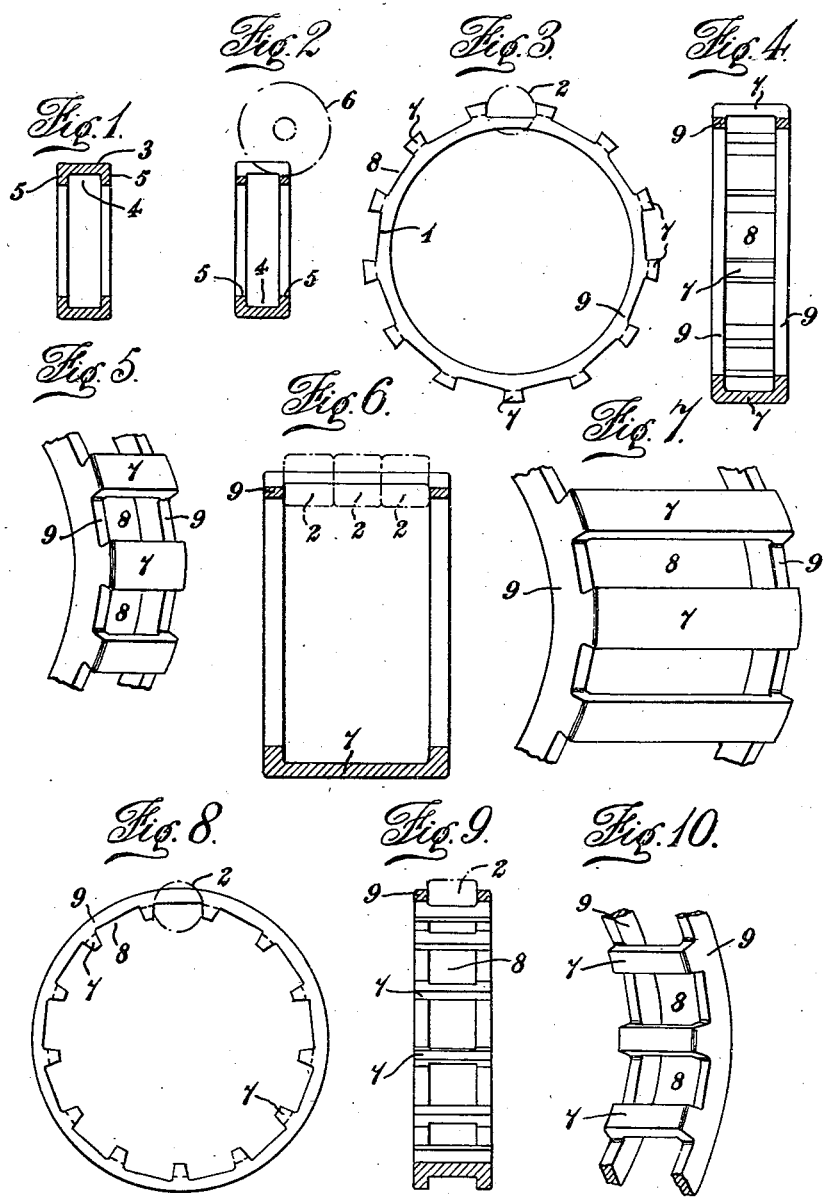
INVENTOR
Frederick O. Hickling
ATTORNEY Dec. 30, 1941.  F. O. HICKLING  2,267,863
METHOD OF MAKING CAGES FOR USE IN ROLLER BEARINGS
Filed Jan. 13, 1939  4 Sheets-Sheet 2
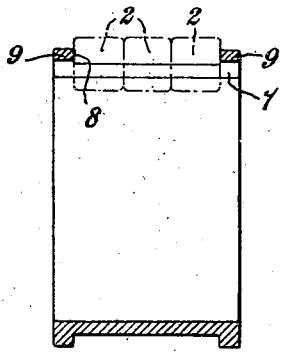
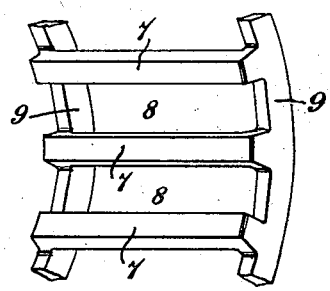
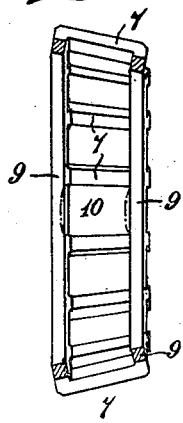
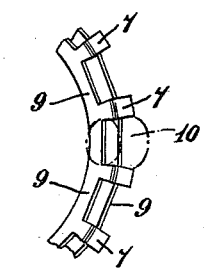
INVENTOR
Frederick O. Hickling
BY
ATTORNEY

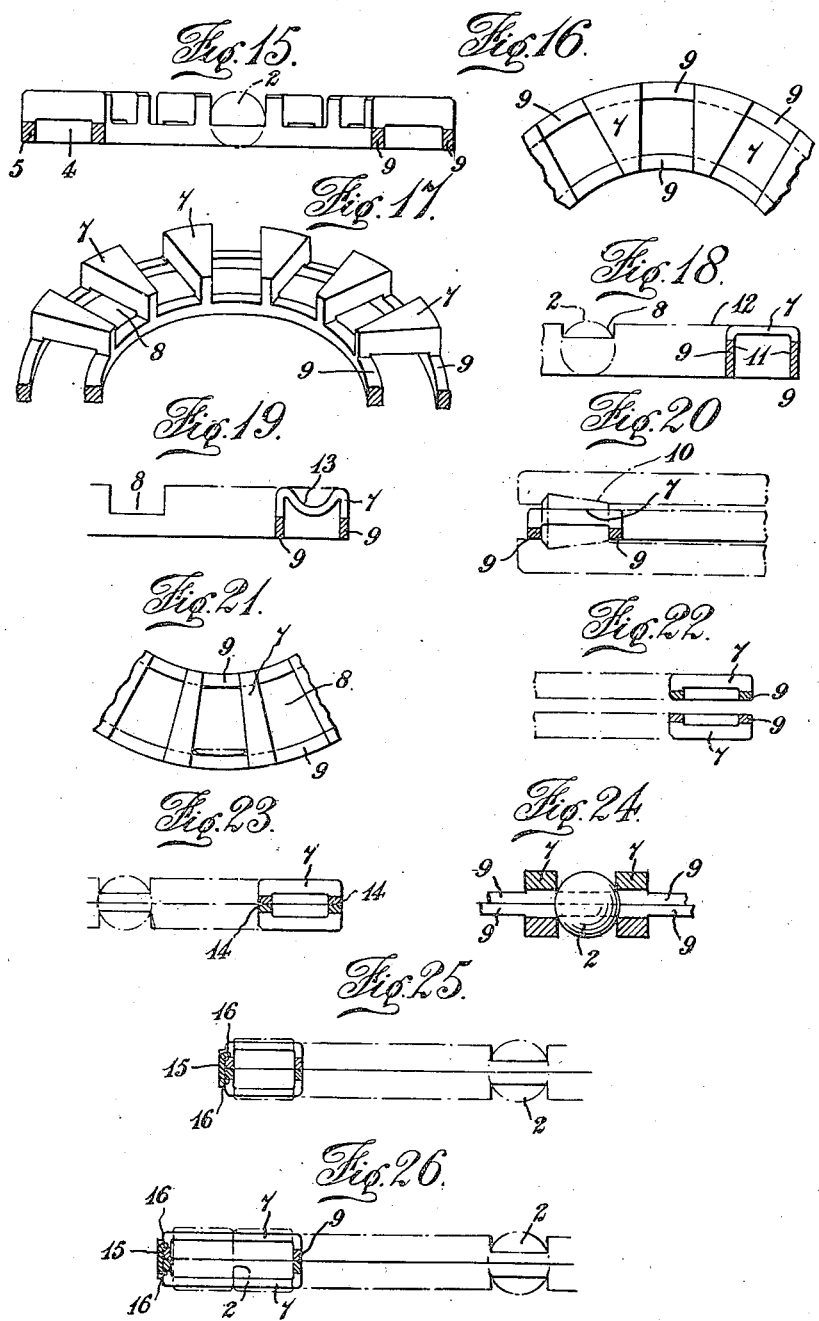

Dec. 30, 1941.  F. O. HICKLING  2,267,863
METHOD OF MAKING CAGES FOR USE IN ROLLER BEARINGS
Filed Jan. 13, 1939   4 Sheets-Sheet 4
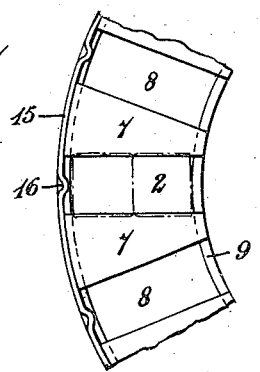
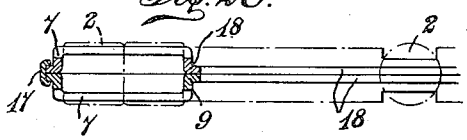
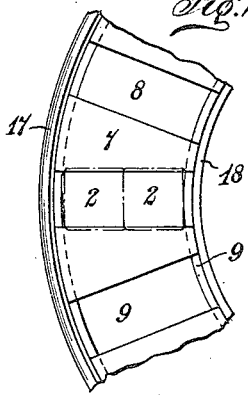
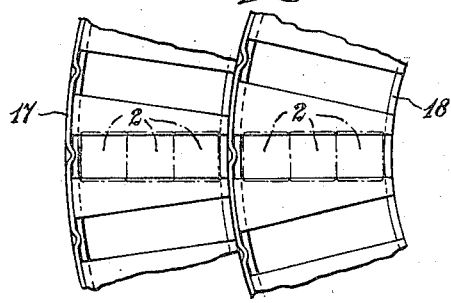
INVENTOR
Frederick O. Hickling
BY
ATTORNEY Patented Dec. 30, 1941

2,267,863

UNITED STATES PATENT OFFICE 2,267,863

METHOD OF MAKING CAGES FOR USE IN ROLLER BEARINGS

Frederick Osgood Hickling, West Bridgford, England, assignor to Ransome and Marles Bearing Company Limited, Newark-on-Trent, England, a British company Application January 13, 1939, Serial No. 250,825
In Great Britain January 24, 1938

4 Claims. (Cl. 29—148.4)

This invention relates to improvements in cages for use in roller bearings and more particularly but not necessarily to improvements in the manufacture of one piece cages, the construction being such that a more efficient cage can be provided at a cheaper cost.

In cages of the two piece type which are riveted together, the amount of raw material used to produce the cage is excessive, and it has been found difficult to make, for instance, a cylindrical cage in two or more pieces dead concentric one piece with the other and otherwise efficient owing to the necessary drilling and riveting. It is the object of this invention to so construct the cage preferably in one piece that it will be of lighter construction, have longer life and be less costly to manufacture.

A further object is to provide a cage of economical manufacture which will require no riveting or spigotting, the arrangement being such that lubrication can be more readily effected thereby increasing the life of the cage and allowing of much higher speeds.

With these and other objects in view the invention consists in the method of forming a roller bearing cage from a sleeve or annulus of material of substantially U shape in section, the material between the flanges of the U shaped sleeve or annulus being cut away at intervals so as to leave a series of spacing bars connected at their ends by ring-like members thus providing slots for the reception of rollers, the said slots being produced either by a milling or hobbing or slotting or broaching operation. In the case of a cylindrical cage for roller bearings the slots are arranged longitudinally of a U shaped sleeve but in the case of a cage for roller thrust bearings slots are radially arranged in an annulus of U shape in cross section so as to provide spacing bars in a plane parallel to but spaced from a plane containing concentrically arranged rings formed by the flanges of the U shaped annulus. The slots may be of equal width throughout for the reception of cylindrical rollers or of tapered formation for the reception of tapered conical rollers.

The invention further consists in providing a cage of substantially bridge formation, the said cage having a series of spacing bars integrally connected at each end to upper or lower ring-like members so that a roller or rollers can be placed and held within each of the apertures formed by the said spacing bars and the connecting rings.

The invention still further consists in forming a cage from a sleeve of substantially U shape in longitudinal section, the apertures for the rollers being formed by slotting the said sleeve at intervals thereby leaving longitudinally arranged spacing bars connected at their ends to ring members, the said ring members being formed by the inwardly or outwardly provided flanges of the said U shaped sleeve, the said sleeve being of either cylindrical or conical formation so that either cylindrical or tapered conical rollers may be used in the said cage. If desired, means may be provided to retain the rollers in the said cage.

The invention still further consists in providing a cage from an annulus of material of U shape in cross section, the material between the flanges of the U shaped cross section being cut away radially at intervals so as to leave a series of spacing bars thereby providing slots for the reception of rollers between the said spacing bars and concentrically arranged rings connected therewith.

The invention still further consists in forming a cage from a pair of the above described members, the rings of the said members being connected together so as to retain the rollers in the said cage, the said rings being connected together by welding or by a clamping ring or rings.

The invention will now be described with reference to the accompanying drawings in which:

Figure 1 is a longitudinal section of a sleeve formed, for instance, from a bar or tube;

Figure 2 is a similar view showing in diagram the operation of a cutter adapted to mill the slots in the sleeve;

Figure 3 is a side elevation of a cylindrical cage shaped according to one form of this invention and adapted to hold a single row of rollers;

Figure 4 is a sectional elevation thereof;

Figure 5 is a part perspective view of the cylindrical cage shown in Figures 3 and 4;

Figure 6 is a substantially similar view to Figure 4, showing a cage of similar construction adapted to hold three sets of rollers;

Figure 7 is a part perspective view thereof;

Figure 8 is a similar view to Figure 3 showing a modified form of cylindrical cage;

Figure 9 is a sectional elevation thereof showing the cage adapted to hold one set of rollers.

Figure 10 is a part perspective view thereof.

Figure 11 is a section of the cage shown in Figure 8 but adapted to hold three sets of rollers.

Figure 12 is a part perspective view thereof.

Figure 13 is a section of a modified form of cage suitable for a taper roller journal.

Figure 14 is a part perspective view thereof.

Figure 15 is a cross section of a form of cage suitable for a roller thrust bearing and made from a bar, tube or forging.

Figure 16 is a part plan thereof.

Figure 17 is a part perspective view thereof.

Figure 18 is a similar view to Figure 15 showing part of a cage made from a pressing.

Figure 19 is a part sectional view of a modified form of cage made from a pressing.

Figure 20 is a part cross section of a cage for a taper roller thrust bearing, the bearing rings and rollers being shown by dotted lines.

Figure 21 is a part plan thereof.

Figure 22 is a part sectional view of two parts of a cage for a roller thrust bearing, and Figure 23 is a similar view showing the two halves of the cage welded together and adapted to retain the rollers.

Figure 24 is a part sectional elevation thereof in diagram drawn to an enlarged scale showing the method of retaining a roller in position.

Figure 25 is a part sectional elevation similar to Figure 23 showing a modified method of holding a two part cage adapted to retain the rollers.

Figure 26 is a similar view to Figure 25 showing a cage adapted to hold two sets of rollers.

Figure 27 is a part plan thereof.

Figure 28 is a similar view to Figure 26 showing a further modified method of connecting two parts of a cage together, the said cage adapted to hold two sets of rollers.

Figure 29 is a part plan thereof.

Figure 30 is a part sectional elevation of a pair of two part cages adapted to hold a multiplicity of rollers, and Figure 31 is a part plan thereof.

According to one form of this invention and when applied to a cylindrical cage 1 adapted to carry cylindrical rollers 2, the said cage which is of bridge or squirrel cage formation as shown in Figures 3 to 5 is produced from either a bar or tube and the method of manufacture of such a cage consists of only two major operations. The first consists in turning the outer diameter 3 and the bore and a recess 4 in the bore and when this operation is completed the sleeve is parted off. Thus there is provided a sleeve of substantially U shape in longitudinal section as shown in Figure 1, the sleeve having an inward flange 5 at each end of substantially square or rectangular shape in cross section. The outer diameter 3 of the sleeve is then longitudinally slotted at intervals in any convenient manner such as by a milling cutter 6 as shown in Figure 2 so as to leave a series of spacing bars 7 conveniently of substantially V or tapered shape in cross section. Thus it will be seen from Figures 3 to 5 that the spaces 8 between the spacing bars 7 will provide square or rectangular shaped holes 8 in which the rollers 2 of the bearing are adapted to be fitted. The cage may be of any convenient length as to permit of the insertion of one or more rollers 2 in each hole or space 8, the said roller or rollers 2 being guided at each end by inwardly arranged rings 9 formed by the inwardly turned flanges 5. In Figures 3 to 5 a cage is shown for one set of rollers but in the construction shown in Figures 6 and 7 the cage is adapted to hold three sets of rollers 2.

In the above construction, a bridge-like cage is provided and the supporting rings 9 are arranged inwardly at each end of the cage, but obviously these rings 9 may be arranged outwardly at each end of the cage 1 by forming the recess 4 and flanges 5 on the outer diameter of the sleeve. The slots 8 may be produced either by milling, hobbing or slotting or by broaching, in the case of the type of cage in which the slots are in the bore instead of in the outer diameter. Figures 8 to 10 show a cage 1 for holding a single row of rollers 2 between spacing bars 7 arranged within the supporting rings 9, and Figures 11 and 12 show a similar cage for holding three sets of rollers 2. It will be seen that the spacing bars 7 in the above described constructions extend the full length of the cage and the slots 8 between the bars 7 also extend the full length of the cage 1. Thus in end elevation the cage is in the form of a ring having either outwardly or inwardly radially arranged projections formed by the ends of the spacing bars 7. When the projections extend radially outwardly, the cage will be constructed as shown in Figures 3 to 7, but when the projections extend inwardly the rings 9 will be on the outer diameter of the cage according to that shown in Figures 8 to 12. The spacing bars or ribs 7 would obviously be slightly tapered in cross section so as to permit of the carrying of cylindrical rollers 2. It will be seen that such a construction will be much lighter and stronger than the riveted type of cage and that the supporting diameters of the cage will be dead concentric one with the other, a condition which rarely applies in the case of a cage of the two piece riveted type. The design is also such as to definitely ensure that the roller holes are dead parallel.

In the above description cylindrical cages have been described, but obviously the cages may be of conical construction and formed to take either cylindrical rollers or tapered conical rollers. Figures 13 and 14 show the invention applied to a conical cage adapted to carry tapered conical rollers 10. In this construction the spacing bars 7 extend the full width of the cage and are integrally connected at each end to rings 9 in a similar manner to that shown in Figures 3 to 7. The cage may be made of any suitable and usual material and the construction is such that the cage may be employed in connection with multi-row roller bearings. It will be understood that cages above described could be made to carry a greater number of rollers than is possible with cages constructed of two or more pieces riveted together since the spacing bars can be of the minimum cross sectional area, and multiple rows of rollers up to any number can be more readily accommodated than is possible with drilled or riveted cages. Heretofore, it has been a lengthy operation to drill the roller holes in a cage, and it has also been found extremely difficult to ensure dead squareness with the axis. As the cage is of one piece construction, the amount of raw material required is considerably less than that required to produce the usual two piece riveted type of cage. Any of the usual and conventional means may be provided to retain the rollers within the cage.

Cages constructed according to this invention can be more readily lubricated as they are of squirrel cage form, and it is obvious that the lubricant is more readily obtained on the portion of the cage and bearings where vitally necessary. Thus the life of the cage is increased and much higher speeds may be permitted.

Obviously the invention may be applied to other types of cages such as to cages for roller thrust bearings of the cylindrical or taper roller type.

In a further modification as shown in Figures 15, 16 and 17, the cage for a roller thrust bearing is also made from a bar, tube or forging. In this case the cage is in the form of an annulus of substantially U shape in cross section. The method of manufacture is substantially similar to that previously described. When the annulus is turned from a bar or tube an annular groove or recess 4 is provided between concentric flanges 5 on the face portion of the annulus. When this operation is completed the annulus is parted off from the remaining material and the flat face of the annulus is radially slotted at convenient intervals in any suitable manner so as to leave a series of spacing bars 7 of substantially V or tapered shape. The spaces 8 between the spacing bars 7 will thus provide square or rectangular shaped holes 8 in which the rollers 2 of the bearing are adapted to be fitted. It will be seen that the spacing bars 7 will thus be integrally connected at each end to concentric rings 9 and that these rings 9 will be arranged in a plane parallel with and spaced from the plane containing the spacing bars 7. The spacing bars 7 and slots 8 therebetween will extend the full width of the annular cage so as to provide slots between the rings 9 for taking the rollers 2. Thus the cage will be in the form of a pair of spaced rings 9 carrying a plurality of V shaped spacing bars 7 projecting upwardly from the said rings 9. The slots 8 may be formed either by milling, hobbing or slotting as in the previous constructions, the material of reduced thickness between the flanges 5 being radially cut away at intervals to provide the connected spacing bars 7.

Figure 18 shows a substantially similar cage to that previously described but constructed from a pressing of an annular U shape, the material being pressed to provide a pair of concentric flanges 11 connected by a substantially flat annular face 12, the latter being so milled as to provide the spacing bars 7 integrally connected at each end to the concentric rings 9.

In a further modification as shown in Figure 19, the annulus is of pressed metal as in the previous construction but the flat face is dished or curved as shown at 13 so as to provide spacing bars 7 of curved or corrugated shape in longitudinal section connected at each end by the concentric rings 9. Such a construction will obviously permit of ready lubrication.

Figures 20 and 21 show a similar type of cage to that described and shown with reference to Figures 15 to 17 but the slots 8 therein are so cut or shaped as to provide slots 8 for the reception of taper or conical rollers 10. The cage will thus be particularly suitable for use in a taper roller thrust bearing. In this case the spacing bars 7 connecting the inner and outer rings 9 are of less taper throughout their length than in the case where cylindrical rollers are used. This form of cage may obviously be made from a bar or tube or from forgings or pressings.

In the above constructions any suitable conventional means may be provided to retain the rollers within the cage. For instance, a groove or grooves may be rolled on the cage so as to extrude projections to retain the rollers. Alternatively, the cage may be made in two halves connected together so as to retain the rollers within the cage.

Figure 22 shows a pair of annular members each being similar to that shown in Figures 15, 16 and 17, but of less thickness. The ring portions 9 of these two members may be connected together in any suitable manner by any convenient form of fastening means so as to secure the rollers therein. Figure 23 shows these rings 9 connected together by welding at 14 the contacting circumferential edges of the rings 9 so that the rollers 2 will be retained in the cage by the oppositely arranged spacing bars 7 as shown more particularly in Figure 24. This form of cage may be made from either a bar, tube or from forgings or pressings.

Figure 25 shows a further modified form of single roller retaining cage made in two halves from a bar, tube, forgings or pressings as in the previous construction but held together by a metal band 15. This band 15 is pressed over at intervals between the spacing bars and into the roller slots as shown at 16, the inwardly pressed portions 16 of the band 15 thereby connecting the rings 9 together so that the spacing bars 7 retain the rollers 2 in the two part cage.

Figures 26 and 27 show a similar type of cage to that shown in Figure 25, the cage being of multi-roller type adapted to hold two concentric rows of rollers.

In a still further modified construction as shown in Figures 28 and 29 the cage is again made in two halves from, for instance, a bar or a tube or from forgings or pressings, the two parts of the cage being held together by means of a metal band 17 rolled over flanges 18 formed on the outer diameter of the outer ring. This metal band 17 is pressed over the flanges 18 to form a ring of substantially U shape in cross section. This metal band 17 is shown on the outer diameter of the annular cage, but obviously a similar band of smaller diameter may be arranged on the flanged inner diameter of the cage to further connect the two parts of the cage together.

Where an even greater multiplicity of rollers is desired, the cages may be arranged one within the other to carry a single or multiple arrangement of rollers. Figures 30 and 31 show such an arrangement applied to cages constructed according to that shown in Figures 26 and 27, and it will be seen that a smaller cage is arranged within a larger cage and the respective cages are independent of each other so as to permit of automatic slip one in relation to the other.

What I claim is:

1. A method of forming cages for use in roller bearings consisting in providing a member of hollow U-form in transverse section, with the cross member of the form forming the sole connection between the otherwise spaced side members of the form, and cutting away the material of the cross member at appropriate intervals throughout the length of the cross member, with the cut slightly exceeding the thickness of the cross member, whereby to provide slots for the reception of the rollers forming the bearing.

2. A method of constructing a cage for roller bearings consisting in providing an annulus of hollow U-form in cross section with the side bars of the form in substantially parallel relation and the cross bar of the form uniting the side bars at one end, and then cutting away the cross bar throughout the full width thereof, and to a degree exceeding the depth thereof, the cuts being disposed in spaced relation throughout the circular length of the cross bar to provide ball-receiving slots.

3. A construction as defined in claim 2 wherein the slots are of equal width throughout to provide for the reception of cylindrical rollers.

4. A construction as defined in claim 2 wherein the slots are of tapered formation from end to end to provide for the reception of conical rollers.

FREDERICK OSGOOD HICKLING.